United States Patent [19]

Cardenas-Franco et al.

[11] 4,357,157
[45] Nov. 2, 1982

[54] ELECTRONIC GOB DISTRIBUTOR FOR GLASSWARE FORMING MACHINES AND THE LIKE

[75] Inventors: Luis Cardenas-Franco; Gustavo A. Sanches-Galindo, both of Monterrey, Mexico

[73] Assignee: Investigacion Fic Fideicomiso, Monterrey, Mexico

[21] Appl. No.: 247,626

[22] Filed: Mar. 25, 1981

[51] Int. Cl.³ .............................................. C03B 7/20
[52] U.S. Cl. ......................................... 65/164; 65/158; 65/163; 65/DIG. 13
[58] Field of Search ......... 65/158, 160, 163, DIG. 13, 65/164; 364/473, 476

[56] References Cited

U.S. PATENT DOCUMENTS

| | | | |
|---|---|---|---|
| 3,594,146 | 7/1971 | Trudeau | 65/164 X |
| 4,007,028 | 2/1977 | Bublitz et al. | 65/163 |
| 4,108,623 | 8/1978 | Cardenas-Franco | 65/163 |
| 4,145,204 | 3/1979 | Farkas et al. | 65/164 |

*Primary Examiner*—Arthur D. Kellogg
*Attorney, Agent, or Firm*—Charles Richard Werner; William H. Maxwell

[57] ABSTRACT

An electronic glass gob distributor for machines which form glassware, thermoplastic or similar articles, comprising one or more glass gob distributing channels each supported on its rotatable shaft, a step motor for actuating each rotatable shaft to move the associated distributor channel toward respective forming stations, a pulse signal generator for each step motor, a pulse amplifier for each glass gob distributor channel to amplify and feed the pulse controlling signals to the respective step motor, and a microcomputer programmer for controlled sequence of the generated pulse signals eminating from a data processing unit connected to an operator's control panel, with suitable conductors from the data processing unit to gob feed sensors and to distribution channel position sensors, with additional conductors to solenoids operating a pneumatic valve adapted to actuate a fluid operated linear motor for moving rejecting channels into gob receiving position to prevent feeding of a gob into the glassware forming position when said gob is not desired for some specific reason, the operator's control panel including three stations, namely: visual information indicators, a digital switch section and a multiple switch section with emergency, start, read, reset, confirm, position and connect buttons, all of the elements of the control panel being connected to the microcomputer through an interface unit of multiple units.

19 Claims, 3 Drawing Figures

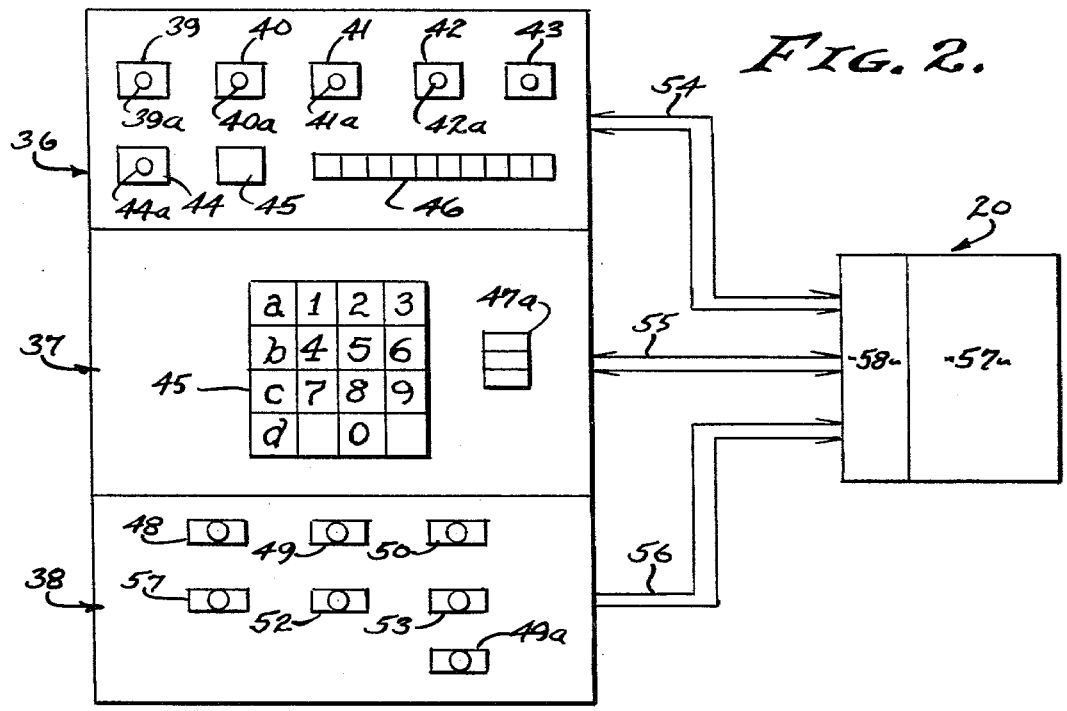

ELECTRONIC GOB DISTRIBUTOR FOR GLASSWARE FORMING MACHINES AND THE LIKE

BACKGROUND OF THE INVENTION

The present invention is related to an electronic glass gob distributor, for glassware article forming machines, or machines for forming thermoplastic article or the like, as well as to an electronic control system to readily and efficiently regulate the movement of the glass gob distributing channels in a programmed sequence and with an exact movement between the several forming stations of the machine.

When manufacturing glass articles or other materials, it is necessary to provide specific doses of melted glass gobs to form certain articles.

These melted glass portions or gobs are obtained from a source containing the melted glass delivered in a continuous stream which is cut intermittently by means of an available controlled cutter, in portions called gobs, which are passed through a gob distributor into one or more cavities on a plurality of the article forming stations, such machines being provided generally with eight article forming stations.

Gob distributors for receiving the gobs from a melted glass stream and feed them into the several forming sections of the machines to manufacture glass articles are very well known and have achieved considerable development in the last years, having brought this type of mechanism to a point of considerable efficiency in units which enable the forming of glass articles in machines of multiple stations, thus increasing the production capacity to a great extent.

The gob distributors known in the former technique comprise generally one or more moving channels, each one of them being supported on a vertical axis, and aligned in such a way that they are moved by means of adequate gear mechanism controlled by a movable cam, which, due to its appropriate design, can make a channel swing at the same time between one glassware forming station and the following station in a specific sequence, duly synchronized by the control cam, in order to obtain the programmed distribution of the gobs from the gob cutter, through the mentioned movable channels towards the corresponding fixed channels in synchronized timing to discharge the gob into the preform station and from this preforming station to the final forming station of the glass article forming machine.

For example, U.S. Pat. No. 3,597,187 to Trudeau issued on Aug. 3, 1971, and assigned to Owens Illinois Inc., and its reissue U.S. Pat. No. Re. 28073 dated July 9, 1974, described apparatus to handle the melted glass molding loads that comprise a pair of curve moving channels, supported on vertical axes that, through appropriate gears, are made to swing by means of a ring gear, mounted on a vertical axis that moves sequentially in a predetermined arc through a transverse spindle which comprises also a cam follower, supported on the control cam, of a specific contour to make the curved channels swing at the same time between one molding station and the following, to discharge the gobs through the fixed channels that carry them to the corresponding preforms in such forming stations. The control cam is controlled to swing by means of a ring gear and a worm screw, which is coupled to a shaft rotatable by means of a synchronized motor which rotates the cam at a constant speed synchronized with the operation controls, for example the timing drum which controls the several operations in each station of a glassware forming machine of glass articles at multiple stations.

U.S. Pat. No. 3,585,017, dated June 15, 1971, to Trudeau, also reveals a device of the same general nature, and it can contain a greater number of channels, for example three, all of them moving at the same time by means of a similar system as shown in U.S. Pat. No. 3,597,187, and its reissue U.S. Pat. No. Re. 28073; such channels being positioned in a block containing a pantograph which keeps the swing of channels from displacing them from their relative positions, in such a form that they are able to swing through the proper angle, preserving their required alignment.

In U.S. Pat. No. 3,721,544, dated Mar. 20, 1973, of Bystrianyk et al, assigned to Emhart Corporation, is also described and claimed a distribution mechanism for gobs for glassware forming machines with multiple cavities and stations, which also comprise essentially a pair of rotating curved channels, each of them being coupled to an indented rack, by means of which they can move at the same time in an angular form from one position to the other of the glassware forming machine, said indented rack being coupled to a common shaft, which at its free end is provided with a cam follower, timed to move by a lever which carries another cam follower supported on a cam, which in this particular case is a horizontal cam, against the vertical cams and with horizontal cam contour as per the Trudeau patents, which in this case performs a function practically identical although by means of another kind of mechanism. The cam in Bystrianyk patent and others, is driven through a transmission that is connected to a synchronized motor causing the cam to swing in synchrony with the operation controls of the diverse forming sections of the machines to manufacture the glass articles.

Finally, U.S. Pat. No. 3,775,083, dated Nov. 27, 1973, to Nebelung et al, assigned to Emhart Corporation, describes and claims a gob distributor for the forming machines of glass articles, which varies in its manner of controlling the movement of the ring gears, timed to move the shafts connected to the moving channels, and at all times in this particular case of the Nebelung's patent and others, such shafts are moved by means of ring gears that are coupled to different racks, each of them being actuated by a linear motor driven by fluid, said motors having a plurality of pistons driven through adequate distances and stopped by adequate stops in such a way that sequential movement can be provided to each one of the motors operated by fluid, in order to enable the mechanism to move the distributor channels between one station and the next one in the sequence, through simple fluid impulses or signals instead of using the traditional cams that were used either by Trudeau or Bystrianyk. Nevertheless, Nevelung and others, use a plurality of individual pistons positioned in tandem in the respective pneumatic cylinders, said pistons being moved individually by means of air signals that are provided from each one of the individual sections of the machine, in order to move the distributing channels in their proper sequence.

The problem encounted due to the use of cams as movable elements to obtain the movement sequences that are required in the distributing channels of a gob distributor for a glassware forming machine, are well known in the art, and reside essentially in the fact that, as the cam is used as a moving element, as was clearly described in the above mentioned U.S. Patents of Trudeau and Bystrianyk and others, such cams suffer considerable wear due to their continuous actuation, which although is very important in a high speed mechanism, must perform in such a way that the cam surface of such cams is readily damaged and because of the wear the distributing channels begin to change their movement, and the moment comes when it is necessary to stop the machine to replace the cam, the variation caused in the position of the distribution channels due to the wear of the cam surface, cause the distribution of the glass gobs to become inefficient in a short period of time. On the other hand the moving cam mechanism, as above mentioned, has the great disadvantage of requiring frequent and accurate maintenance in the fixed channels that receive the glass gobs corresponding to each one of the forming stations, as it is possible that the distributing channels or the fixed channels can be out of alignment very slightly, although a considerable misalignment can occur between such fixed and moving channels of the distributor, with which the distribution of the glass gobs to the several sections of the glassware forming machine becomes also inefficient in the case of such slight misalignment of the channels. On the other hand, these mechanisms operated by a moving cam require that the motor be strictly synchronized with the timing drum of the forming machine of glass articles, inasmuch that if the motor is delayed or advanced there is no way to correct it unless the machine is stopped and required repairs are performed.

Another considerable disadvantage presented by the mechanical control of a moving cam for the gob distributors, resides in the fact that, such controls, based on a mechanical cam, does not provide for any possibility of modification if desired, of the operational sequence of the several sections of the glassware forming machine, unless the cam is replaced by one totally different, which is designed for another sequence, and this, of course, can be done only after stopping the machine to make the cam replacement, such mechanical operation in itself, being very complicated, since the cam is normally covered and it is necessary to disassembled many parts to make the replacement. Finally, with this type of moving cam, it is necessary to operate the gob rejector, in the event that the glass gobs pass to one or more sections of the machine that may be under repair or in the process of changing of molds or similar operations, in a way separated by controls totally different, which should be operated by means of fluid or mechanical signals totally different which constitutes another serious disadvantage of this kind of moving cam mechanisms.

Even though the control mechanism of the Nebelung et al U.S. Pat. No. 3,775,083 eliminates totally the use of a moving cam to control the moving channels and movement of the glass gob distributor; instead, a considerable complexity is incorporated to the mechanism, whereby the provision and construction of a plurality of individual pistons is required, all of them being placed in tandem and abutting one against the other in a predetermined sequence, in order to make the staged and sequential movements of the distribution channels, so that the complexity in the mechanism causes continuous failures and makes the fluid control highly inefficient, and mainly for high speed performance such as required in the glassware forming machines.

In this particular case an additional signal of the several glassware forming stations for the forming machines of is also required, to provide for rejection in the event that one of the sections is in repair or the mold is being replaced.

Upon carefully analyzing the failings in the prior art devices and all of these problems, herein enumerated, Fabricación de Máquinas, S. A., a Mexican company, located at Guerrero Norte No. 3200, Monterrey, Nuevo León, México, designed and built a hydraulic control mechanism for a gob distributor in glassware forming machines, in which the rotary channels of the gob distributor were engaged to respective gears, which were synchronized by means of a rack coupled to a hydraulic system, including a hydraulic servomechanism which provides all the movement control, and the hydraulic servomechanism followed a control cam that provided the angles of the movement, times of stop, acceleration and deceleration of the system, and including the distribution channels of the melted glass gob distributor. In that way, the cam that traditionally had been used as a moving element, as per the former description, with regard to the Trudeau and Bystrianyk and other patents, this particular system is used only as a control element that was not exerting any considerable effort, since the effort was exerted by the hydraulic system itself when moving the total gearing and the distribution channels, and, therefore as this was a semihydraulic system operating at high speed, it achieved much better responses and more precise than the previously described mechanical systems, and furthermore, the endurance of the cam was much longer, and had less problems in regard to the type of maintenance required. Nevertheless, this system proved to be inefficient at low speed, since it presented serious adjusting and maintenance problems, in addition that normally, the hydraulic systems require certain amount of care in operation.

SUMMARY OF THE INVENTION

Having in mind the defects of former techniques, it is a primary object of the present invention to provide an electronic gob distributor, and a control system for the same in the glassware forming machines, which does not use mechanical or hydraulic means to achieve the movement control, but instead uses an electronic system for an easy performance and high flexibility.

It is another object of the present invention to provide an electronic gob distributor and an electronic control, of the above mentioned nature, which enables the independent performance of the actuating shafts of the distribution channels for the glassware forming machines, in order to independently control each one of such channels to achieve a higher accuracy and flexibility.

A further object of the present invention, is to provide an electronic control system, of the above mentioned nature, which operates at the same time, in a predetermined sequence, the rejecting mechanism of melted glass gobs, when the gobs are not desired to arrive to a certain section of the glassware forming machine, that is under repair or during mold replacement.

Another particular object of the present invention is to provide an electronic gob distributor and an electronic control system for the same, of the nature described above, that are capable of operating independently for each one of the distribution channels for the glassware forming machine of multiple stations, and to each multiple chambers station, through the simple electronic drive of pulse or step motors which operate each one of the shafts independently.

Another object of the present invention is to provide an electronic control system, in accordance to the aforementioned, that is able to vary the operation sequence by the simple feeding of logic signals to the system, without the need of lengthy operational stops of the machine, for the purpose of replacing the mechanical or hydraulic actuating members as was heretofore necessary.

A further object of the present invention is to provide an electronic gob distributor and an electronic control system of the before mentioned nature, which although of greatly increased efficacy, efficiency and accuracy, could remain within a competitive cost range in relation to the hydraulic or mechanical systems.

It is a further object of the present invention to provide an electronic control system, of the above mentioned nature, that is able to correct the angular position of each one of the distribution channels which are independent one from the other, in order to compensate any phase difference or misalignment of the fixed channels of the gob distributor of a glassware forming machine of multiple stations.

The aforementioned and other related objects, are preferably achieved, in accordance with the present invention by providing an electronic gob distributor which is free of mechanical or hydraulic operating means, and which comprises at least one distributing channel; one pulse or step motor coupled directly or indirectly to the rotary axis of each distributing channel to move the distribution channel towards the respective forming station; one pulse or step motor controller, which actuates as a pulse source, a pulse amplifier, to amplify the pulses of the controller and feed them to the pulse motor; and one microprogrammed sequence system, to sequence the controller.

A particular aspect of the distributor, and especially to control the distributor electronically, the pulse motor controller can be included in an information or a data processor which receives and processes the information within the operation parameters.

Further, we have provided an electronic control system which comprises essentially a pulse or step motor coupled directly or indirectly to each one of the rotary axes of the distribution channels; one gob feed sensor which could be either a gob cutter sensor, or a gob cutter sensor which detects when the gob reaches the distributing channel, adapted to send a signal at the moment when the gob cutter is placed directly over the distributing channels, thus cutting the gob and/or sending a signal at the moment the gob is cut, and when the gob reaches the channel and/or to provide a signal from both sensors in order to calculate the dropping time of the gob, or the time between when the gob is cut and when it drops into the distributing channel; a signal amplifier for each distributing channel to operate the respective pulse or step motors; a gob rejection system, which comprises a lineal motor operated by fluid coupled to a rejection channel and to a solenoid valve in order to actuate the linear motor, which is capable to divert the gob toward a collector, when it is desired to prevent the gob from being fed to a forming station which is out of operation; and one information or data processor which comprises a computer, and interphase card and an operator board, in which the signals from the gob feed sensor are received and fed to actuate the distributing channels and/or to provide a delay time independent from the height from which the gob falls after being cut in the intake of the distributing channel and to provide for actuation of the pulse or step motors at a determined number of pulses into an ordered and programmed sequence on the information or data processor; and, finally, to send a signal to the solenoid valve to actuate the lineal motor to reject or deviate a gob between the rejecting channel or channels.

The system can be accomplished by the provision of the position sensors placed on each one of the individual pulse or step motors, which sent the signals to the information or data processor in order to correct the angular position of any one of the individual distributing channels, in the case that misalignment occurs between the distributing channels and the fixed conducts of each forming station of the machines to produce glass articles with multiple stations and cavities.

On the other hand, regardless that we have indicated that either the distributor or the control system can include a pulse or step motor for each channel, a single pulse or step motor could be included for coupling to a common axis which moves the shafts of the channels in conjunction.

BRIEF DESCRIPTION OF THE DRAWINGS

The novel aspects considered characteristic of the present invention are established in particular in the claims following the description. Nevertheless, the invention itself, due to its organization or the operational methods, in conjunction with other objects and advantages of the same, will be better understood by reference to the following detailed description of one specific mode, when read in relation to the accompanying drawings, in which:

FIG. 2, is a block diagram of the processing system of the present invention, and particularly of the computer and the operator's control board. And FIG. 3, is a block diagram ilustrating the computer and its interphase card with their interrelation with the operator's board and with the sensors and motors of the control system of the present invention.

DESCRIPTION OF THE PREFERRED EMBODIMENT

Figure 1:
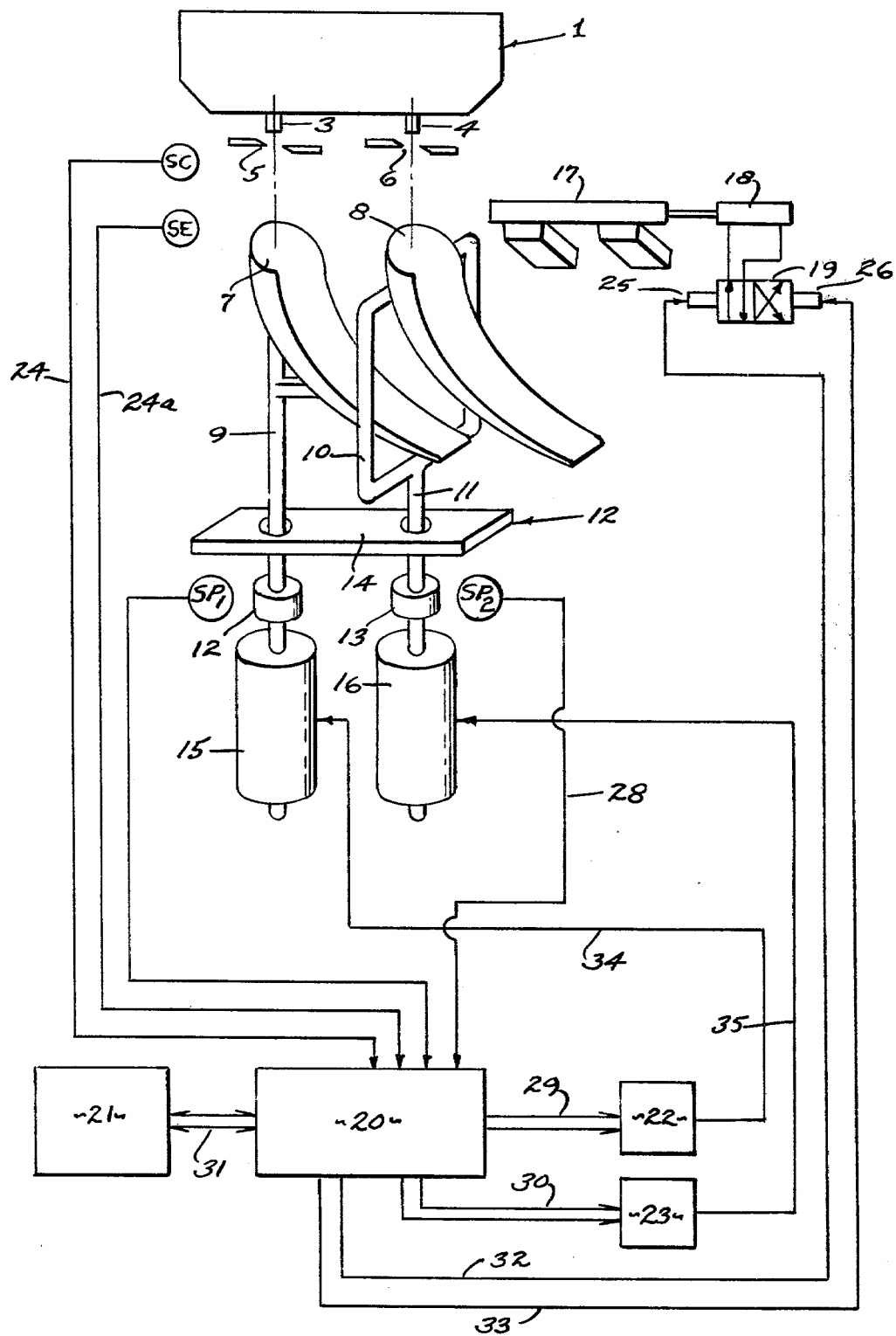
FIG. 1, is a diagram which shows schematically the distribution channels of the electronic gob distributor for a glassware forming machine, and illustrating in block diagram the electronic control system for the same, constructed in accordance with our invention.

Referring now to the drawings by numerals of reference, in FIG. 1 is diagrammatically shown a form of the electronic gob distributor as well as the electronic control for same, constructed in accordance with the present invention, and designed for use with a glassware forming machine of the Hartford IS type, an "IS" machine being one with Individual Sections for blowing glass articles.

In the form particularly described in the accompanying drawings and in FIG. 1 in particular, the electronic glass gob distributor for the glassware forming machines with multiple stations, is a distributor which provides simultaneously two gobs to the two cavities of each one of the stations of the glassware forming machine, from a molten glass supply which comprises a receptable 1 from which is fed the glass gobs through a glass gob distributor 2. Receptacle 1 contains discharge conducts 3 and 4, located respectively immediately above cutter elements 5 and 6, adapted to sever or cut the glass into gobs which drop by gravity into the moving distribution channels 7 and 8, said distribution channels as illustrated in this application, being in duplicate and placed one behind the other, the front channel being provided with a ring support 10, which is supported on a shaft 11, while the rear channel 7 passes through the mentioned ring support 10 and is carried on the shaft 9, to achieve rotational movement to attain predetermined angles of said channels 7 and 8.

The moving distribution channels 7 and 8, for the purpose of guiding the glass gob which drops towards them from the cutters, may be provided with adequate funnels (not shown).

The shafts 9 and 11 of the distribution channels 7 and 8 respectively, pass through a common support 14, and are coupled by means of available coupling members 12 and 13, responsively to the pulse or step motors 15 and 16, which are adapted to rotate the shafts independently by means of precise measured movements imparted by pulses fed to each of the motors 15 and 16, each pulse of the motors being approximately equivalent to a 0.9° angle.

In this particular case, the pulses or step motors 15 and 16 are operated by a data processing unit 20 through the signal amplifiers 22 and 23, the additional operation and purposes of which being described hereinafter.

The electronic control system per se, as constituted in accordance with the present invention, comprises essentially a gob feeding sensor which, in this particular embodiment of the invention, comprises gob cutting sensor SC which sends a signal to the information processor at the moment when the gob is cut, or, by the gob cutting sensor SC as well as an intake gob sensor SE which detects the gob when it contacts the channel, in order to detect the passage of the gob to the distributing channels and/or to calculate the time of dropping of the gob, or in other words the time between the cutting of the gob by cutters 5 and 6 and the time it reaches the distributing channels 7 and 8; this data being received by the data information processing unit 20 to which the gob feed sensors SC or SC and SE, are connected by the conductors 24 and 24a.

The electronic control system, in accordance with the present invention, also comprises the pulse or step motors 15 and 16, which operate independently through shafts 9 and 11 of the distribution channels 7 and 8, such pulse or step motors 15 and 16 being connected by means of respective conductors 34 and 35, to the signal amplifiers 22 and 23 which are actuated in sequence and controlled through the data processing unit 20, which sends logic signals 29 and 30 to the signal amplifiers 22 and 23.

The electronic control system built in accordance to the present invention, is also provided with the operator's panel 21, which sends and receives the logic signals 31 from and to the mentioned data processing unit 20, in accordance with what will be further described with more detail as related to FIGS. 2 and 3 of the drawings.

We have provided an option of at least two position sensors SP1 and SP2 to determine the angular position of each pulse or step motor 15 and 16, respectively, in order to supply a signal through conductors 27 and 28 to the data processing unit 20 to enable to effect correctional positioning when required, as well as to indicate the initial position of the distributing channels 7 and 8.

The illustrated electronic control system comprises further a system for gob rejection which can adopt several forms but preferably comprises in a set of rejecting channels 17, actuated by a linear fluid motor 18, capable of introducing and/or removing the rejecting channels to and from an intercepting position of glass gobs, by placing the set of channels 17 directly under the conducts 3 and 4, or into a position out of alignment with the conducts 3 and 4 from which the glass gobs are fed. Linear motor 18 is actuated by pneumatic valve 19, which in turn is actuated by a pair of solenoids 25 and 26 to provide reciprocal movement in a manner to be described in more detail hereinafter.

The data processing unit 20, functions to send electrical signals through conductors 32 and 33 to the respective solenoids 25 and 26 of the pneumatic valve 19, to cause movement of the lineal fluid driven motor 18, which actuates the rejecting channels 17 in the desired sequence.

As clearly illustrated in FIG. 2 of drawings, the operator's control panel 21 is comprised of three sections, one section 36 containing the displays or signs of information, generally indicated by reference numeral 36 in FIG. 2 of drawings, a second section 37 which contains a plurality of digital switches 47 and a third section 38 which contains a plurality of stop or cutting switches and a plurality of command switches, which will be described in more detail hereinafter. Each of the sections 36, 37 and 38 of the operator's control panel 21, are connected to the data processing unit 20, which is comprised of a computer 57 and an interface card 58, the latter being coupled to the operator's control panel by means of logic signals 54, 55 and 56, each one corresponding to certain sections of operator's control panel 21.

Section 36 of the operator's control panel 21, preferably contains a plurality of signs and luminous indicators as follows: 39, 39a to indicate when the control system is turned on; 40, 40a to request and acknowledge receipt of the height from which the cut glass gob is dropped by the mechanisms 5 and 6 to the channels 7 and 8 to request and acknowledge receipt of the sequence in the electronic control system; 42, 42a, to request and indicate that the degree correction signal has been introduced for movement of the distribution channels 7 and 8, in order to align them with the fixed channels which are phase displaced or deviated in the glass gob distributor system; 43 is a signal which indicates lack of information; 44 and 44a requests and acknowledges receipt of an indication that the system is ready to operate; 45 is a signal to indicate that the system is in operation; and 46 is a digital exhibitor or display of seven segments and ten digits, capable of indicating the numeral information necessary for the operator.

Section 37 of the operator's control panel 21 contains merely a plurality of digital switches 47, numbered from 1 through 9 to 0 and including also switches denoted by a, b, c, and d for the purpose which will be described in detail hereinafter. In addition, a digital thumbwheel type switch is provided to introduce the datum of the section number which is to be affected by the rejecting mechanism.

Finally, section 38 of the operator's control panel 21, contains seven interruptor switches, namely; 48 which is an emergency push button, 49 which is a start button and 49a which is the turn-on button, 50 which is the button for reading the information from the plurality of digital switches 47, 51 is a reset key, 52 is a button to confirm the turning on and off of the rejecting mechanism, and 53 is a position switch to determine the turning on and off of the rejecting mechanism.

All the switches of section 38 on the operator's control panel 21 send signals through the conductor 56 to the interface card 58 which transmits them to the computer 57 of the data processing unit 20, in order to perform the several functions of the machine with which the electronic control system is associated.

In FIG. 3 also is illustrated a block diagram, the schematic interconnection of the several sections of the electronic control system of the present invention, and it will also be seen that the computer 57 receives the signals from sensors SC, or from SC and SE, as well as from the operative positioning sensors SP1 and SP2, which indicate the angular position of the shaft and of channels 12 and 13 and the pulse or step motors 15 and 16 (See FIG. 1), and sends logic signals 29 and 30 to the amplifiers 22 and 23 for the motors 15 and 16, as well as electronic signals 32 and 33 to the solenoids 25 and 26 of the valve 19 to motor 18.

In particular, each signal amplifier 22 and 23, comprises one signal decoder 65 and 67, and an amplifier 66 and 68, which receive the signals 29 and 30 from the computer 57, said signals being decodified thereby and transmitted to the amplifiers, and thence the amplified signals pass through lines 34 and 35 to the pulse or step motors 15 and 16, which are actuated in response to said mentioned signals.

The interface card 58, by itself, comprises a plurality of sections. A first section 59 handling the digital display 46 for numerical information and which receives a signal 69 from the computer 57, for transmitting same through conductor 54a to the digital display 46 in order to give the operator the required data of the control system. A second section 60 of the interface card 58 receives a signal 70 from the computer 57 to operate indicators 39a, 40a, 41a, 42a and 44a. A third section 61 receives a signal 71 from computer 57 to operate the information signs 39, 40, 41, 42, 43, 44 and 45 through conductor 54c. A fourth section 62 receives and sends the logic signals 72 to the computer 57, and at the same time will receive and send said signals through conductor 55 to the set of digital switches 47. A fifth section 63 sends a signal 73 to computer 57, received through conductors 56a of any of the interruptor switches 48, 49, 51 and 53. And finally, a sixth section 64 which receives the signals from switches 50 and 52 through conductor 56b to transmit signal 74 to computer 57.

MODE OF OPERATION OF THE ELECTRONIC CONTROL SYSTEM

The operation of the electronic control system, constructed in accordance with the present invention and as per the above description in relation with the accompanying drawings, is as follows:

To initiate the operation of the system constructed in accordance with the present invention, the start button 49a is operated first which will cause the indicator lights 39, 39a to be lighted, thus indicating that the system is turned on. At the same time, the indicator 40 will be actuated to indicate height of the gob drop and notifies the operator to introduce the height data to the data processing unit 20 in the system of the present invention, in such a way that the control is ready to wait for the information.

Through digital switches 47, the time data is selected corresponding to the height from which gobs are dropping, and this information appears in the digital display 16. Further the reading button 50 is pushed and indicator 40a is lighted, which indicates that height data has been passed to the memory in the data processing unit 20 at which time height indicator 40 turns off. At the same time the sequence sign 41 is turned on, indicating that sequence data should be introduced by the operator to the data processing unit 20, and the system waits for the information. Through digital switches 47 sequence data is introduced, and it appears in the exhibitor 46. Switch 50 is again actuated to take the reading and when indicator 41a is lighted it indicates that the sequence has been introduced in the memory of the data processing unit 20, and at the same time the sequence sign 41 is turned off. At that moment sign 42 turns on automatically and requires the correction in degrees and the system is ready to wait for the information.

By use of the digital switches 47 the information is placed in the degrees correction necessary for anyone of the sections, by introducing the information on the number of section and the degrees of corrections, which cavity is involved and whether positive or negative correction is required in said section, said information appearing in the digital exhibitor 46. Reading switch 50 is pushed again, and if additional corrections are required for the other sections of the forming machine for glass articles, the control automatically again waits for the information to correct the degrees, and the corresponding sign 42 is again lighted. If no further corrections are necessary, key d is pushed on the digital switches 47, lighting indicator 42a automatically to indicate that correction will be introduced in degrees to the data processing unit 20, and signal 42 in degrees of correction will be turned off simultaneously.

At this moment, the system is programmed to prove that aforementioned data has already been given, and if so then the signal of lack of information 43 automatically turns off and signal ready to operate 44 turns on.

Start switch 49 is then pushed, and signal of ready to operate 44 is turned off and switch 44a turns on, which indicates that information is ready to operate the system, at which time signal 45 turns on, indicating that the system is ready in operation.

On the contrary, if the system indicates that all data has not been provided, then signal 43 of lack of information turns on immediately.

When this occurs digital switch a, b or c is pushed on the digital switches board 47, depending on whether the height indicators 40a, sequence indicators 41a or degrees correction indicators 42a, are turned off, respectively, or if desired to make an additional correction in any of such data.

In the case that switch a is pushed, the system returns automatically to light signal 40 of height, and will wait for information in this respect. If digital switch b is pushed, then the system returns immediately to the stage of lighting signal 41 of sequence and will await information on this respect. Finally, if digital switch c is pushed, then the system returns automatically to the stage of lighting signal 42 of degrees correction and will wait the corresponding information to this respect.

Finally, if digital switch d is pushed, then the system returns to the stage of checking if all the information is introduced into the processing unit 20, preparatory to go ahead.

Although the operation sequence just described is the preferred one to handle the electronic control system of the present invention, it should be noted that such system can operate without following the former sequence, when there exists full assurance that data to be introduced into the machine is the correct data, in which case checking for the lack of information is not necessary. This means that the machine can operate by using the digital switches a, b, c, and d, by introducing to the data processing unit 20, all the data by means of the digital switches 47, and posteriorly to order the execution of them by means of the starting button 49.

Independent of the sequence used to operate the electronic control system of the present invention, such control calculates the times and places the gobs rejector 17 in the operative position. The rejector is placed in the section in which the cycle is initiated, and awaits the dropping of two consecutive gobs in such section, in order to calculate the time cycle through the derivation of this data from the cuts per minute that are being done and immediately after, removes the rejector 17 through the adequate signals 32 and 33, so that the section as per the sequences that have been fed to the machines will begin to function. This cycle of time will be determined by means of the signal that sends the gob cutting sensor SC, or SC and SE through the line 24 to the data processing unit 20, waiting, as stated before, the dropping of two consecutive gobs in order to calculate the time of delay between the dropping of one gob and the dropping of the other, so that, the time data of the total cycle endurance of the system be is fed in order to drive the pulse or step motors 15 and 16 at the proper speed towards the positions marked in the sequence that was fed.

Finally, when the emergency stop button is pushed, the system is stopped placing the rejector 17 in its operative position so that no more gobs will drop into the forming machine of glass articles.

On the other hand, in order to check the position of rejector 17, confirmation of rejection by use of button 52 is possible; to operate the rejector, the information is introduced to the corresponding section on the digital switch board 47a, and the reject acting switch 53 is placed in position to posteriorly push the switch 52, which confirms the position of rejector in order of placing it in the desired position.

From the above, it can be seen that for the first time an extremely efficient system has been provided, which does not readily wear out mechanical parts, and which independently operates the shafts of each one of the distributing channels of the electronic distributing system of glass gobs, for a machine of multiple sections, whereby there exists the possibility of introducing any sequence of operation for such channels, through the simple feeding of the information through the adequate digital switches, without the need of undesirable stoppage of the machine. Furthermore, with the electronic control of the present invention it is possible to independently correct, by means of 0.9° increments, the position of any of the distributing channels, in order to put them in alignment with the fixed channels of the drop distributor of the machine. This was not possible with any of the mechanical or hydraulic systems of the former technology. Also, by the introduction of position sensors of each one of the individual pulse or step motors, the data processor receives information at a given moment of the position in which the distributing channels of glass gobs are placed, and to reinitiate the sequence in any point or section of the machine without the necessity of pushing the reset button to initiate again the cycle of the machine from the beginning, in any momentous stop that could exist in the machine. Besides, such position sensors provide a feed-back signal to the data processing unit so that, at any moment it can correct the movement equation of the channels from one position to the next, whereby the operator can designate a given sequence, in order that the forming stations of glass articles that were programmed are not apart in more than five stations. In that way, the controller can determine a higher or lower acceleration, by the signals received from these positions sensors SP1 and SP2, in order to give a greater flexibility to the control of the present invention over the prior art. This did not exist in any other of the mechanical or hydraulic mechanical controls of the former technology, ours is synchronized automatically.

Although certain specific modes have been shown and described of the present invention, it should be noted that it is possible to make several modifications to such modes. Therefore, the present invention should not be restricted to what has been described and illustrated, but should be reviewed in the light of what novelty has been disclosed and claimed herein and illustrated in the accompanying drawings.

What we claim is:

1. An electronic gob distributor, for glassware forming machines and machines for forming thermoplastic articles and the like, which comprises in combination: means delivering gobs severed by cutting action from a continuous source; at least one vertical and axially curved distributing channel mounted to a vertical rotatable shaft, the top end of the channel being open for gob reception from said means and maintained in the same axial position independent of the shaft rotation; means for synchronized movement of the lower end of the channel into a plurality of positions and each of which conveys the gobs to one of a plurality of forming stations of the machine; a step motor coupled to the rotary shaft of each distributing channel for said rotation of said shaft to position the lower end of the channel in alignment with a forming station; a step motor controller which actuates a pulse source; a pulse amplifier for each channel to amplify the pulses of the controller and feed them to the respective step motor; and a computer means programmed to sequence the controller for said synchronized movement of the lower end of the channel into said plurality of positions with respect to said plurality of forming stations.

2. The electronic glass gob distributor as set forth in claim 1, which comprises a gob rejector that diverts a gob towards a collector, in order to avoid its feeding to any of the forming stations selected in the machine.

3. The electronic glass gob distributor as set forth in any one of claims 1 or 2, which comprises a synchronized signal source to actuate the step motor in synchronization with relation to the gob cutting action of the first mentioned means, to the operational sequence of the forming stations of the machines, and to actuate the gob rejector when required.

4. The electronic glass gob distributor as set forth in claim 1, which comprises only one step motor coupled to a common drive which moves the shafts of the channels.

5. The electronic glass gob distributor as set forth in claim 1, in which the step motor controller and the computor means programmed to sequence the controller and a synchronized signal source are included in an information processor.

6. An electronic control system for a glass gob distributor of a forming machine of glass articles, thermoplastics and the like, in combination with a glass gob distribuutor of the type which comprises, means delivering a gob severed by cutting means from a continuous source, at least one vertical and axially curved distributing channel mounted on its upper end to a vertical rotatable shaft, the upper end of the channel being open for gob reception from said cutting means and maintained in the same axial position of the gob reception, independent of the rotation of the shaft, means for synchronized movement of the lower end of the channel between a plurality of conduits which convey the gob to a corresponding forming station of the machine; the electronic control system comprising: at least one step motor coupled to the rotary shaft of each distributing channel for rotation of said shaft and to position the lower end of the channel in a coincident relation with the corresponding conduit; an information processor to receive and process information on the operation parameters; an information source to introduce the information to the processor; a signal conditioning circuit to condition the signals from the information source between the information source and the processor; a signal amplifier for each one of the distributing channels to send operation signals to the step motor; a gob feed sensor to send the signal to the information processor at the moment a gob is being fed into a channel; and a gob rejection system which diverts the gob toward a recollector in order to avoid feeding the gob into one of the selected forming stations of the machine in response to a signal from the information processor.

7. The electronic control system as set forth in claim 6, in which only one step motor is included, said step motor being coupled to a common drive which simultaneously moves the channel shafts.

8. The electronic control system as set forth in claim 6 or 7, in which the information source is an operator's control panel which comprises a plurality of indicators and switches.

9. The electronic control system as set forth in claim 6, in which the glass gob feed sensor is responsive to the cutting means cutting the gob and which sends a signal to the information processor at the moment in which the gob is cut to be fed into the channel.

10. The electronic control system as set forth in claim 6, in which the gob feed sensor is a gob severed sensor and a gob intake sensor related to a channel, and which sends a signal to the information processor when the gob is cut and reaches said channel.

11. The electronic control system as set forth in claim 6, in which a gob cut sensor and a sensor for gob intake to the channel send their signals to the information processor which receives and processes the signals from both sensors to calculate the time of delay between the time of cutting of a gob and the time it is received in the channel.

12. The electronic control system as set forth in cllaim 6, in which the gob rejection system diverts a gob from at least one channel and toward a recollector, comprises: a linear motor driven by fluid coupled to movement of the rejecting channel, and one valve operated by a solenoid to actuate the linear motor, in accordance to the rejecting sequence which is fed into the information processor.

13. The electronic control system as set forth in claim 6, in which the operation parameters which are fed into the information processor are the time of cutting of the glass gob, the operation sequence of the forming stations of the machine, the angular correction of the initial position of the channels, the equation to calculate the forming cycle time from the period between two consecutive cuttings of the gobs fed by a gob cut sensor, and the gob rejection sequence.

14. The electronic control system as set forth in claim 6, including at least one position sensor coupled to the step motor in order to send a re-freed signal to the information processor, to make the necessary corrections in the number of pulses fed to the step motor, and to indicate the initial position of the channels.

15. The electronic control system as set forth in claim 6, in which the operator's control panel comprises a plurality of digital switches to provide digital information on the adequate operation parameters such as the time of cutting of gobs, and including, a plurality of cut switches which comprises a resetting switch, a start switch, and emergency stop switch, and an intake switch for the gob rejection system, and a plurality of common switches including a switch to read the information, a switch to check the position of the gob in the rejection system, one starting switch, and a plurality of displays.

16. The electronic control system as set forth in claim 6, in which the information processor comprises a computor and a signal conditioner circuit in the form of an interface card that communicates with the circuits on the operator's control panel, the interface card comprising command decodifying circuits to control the step motor, handling circuits with visible digital dials to display and handle the digital information displayed on the operator's panel, resilience eliminating circuits for the operation of the operator's control panel switches, and resistor cutoff circuits for the operation of the cut-off switches of the operator's control panel.

17. The electronic control system as set forth in claim 16, in which the computor includes a non-volatile memory containing the cycle equation and a volatile memory interconnected with the non-volatile memory and which is capable to receive the respective operation parameters fed by the operator's control panel and by the sensor in order to determine the enduring times and sequence contained in the non-volatile memory.

18. The electronic control system as set forth in claim 6, in which the electronic control system is associated with a glass gob electronic distributor comprising a plurality of distributing channels, each one of the distributing channel shafts being independently coupled with a step motor driven from the information processor, whereby said distributing channels can be handled independently from the operator's control panel.

19. The electronic glass gob distributor as set forth in claim 1, wherein such channels are provided with a funnel on the upper end of each channel.

* * * * *